April 7, 1931.                J. F. COOPER ET AL                1,800,178
                              FLEXIBLE CONNECTION
                              Filed April 24, 1929

Inventor
James F. Cooper
Harold D. Cameron

By
Attorney

Patented Apr. 7, 1931

1,800,178

UNITED STATES PATENT OFFICE

JAMES F. COOPER AND HAROLD D. CAMERON, OF AKRON, OHIO, ASSIGNORS TO THE GOODYEAR TIRE & RUBBER COMPANY, OF AKRON, OHIO, A CORPORATION OF OHIO

FLEXIBLE CONNECTION

Application filed April 24, 1929. Serial No. 357,808.

This invention relates to connections which provide fluid-tight unions between fluid supplying conduits and flexible containers, such as airship gas cells, balloons, pontoons, etc.

The object of the invention is to provide connections in the form of patches which serve to reinforce the walls of various sorts of containers at locations where the connections are attached, and which facilitate the supplying of fluid to the containers without danger of leakage or injury to any of the elements thereof.

For a better understanding of the invention, reference may now be had to the accompanying drawings, forming a part of the specification, of which;

Figure 1:
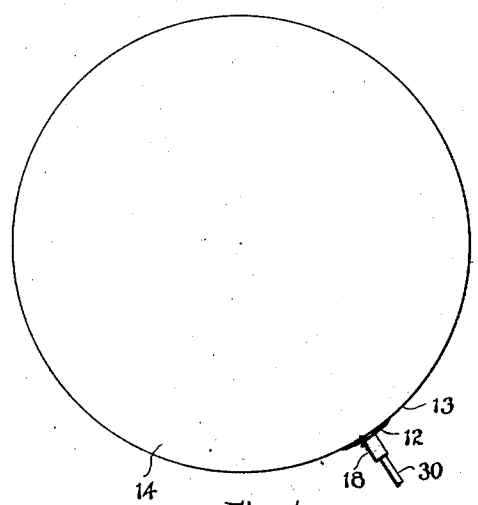
Figure 1 is an elevational view of a container having a construction embodying the invention applied thereto.
Figure 3:
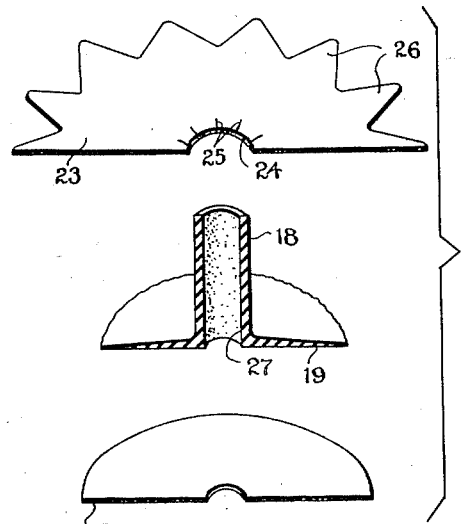
Figure 3 is an exploded view partially in cross-section showing the principal elements embodied and assembled in a construction according to the invention.
Figure 2:
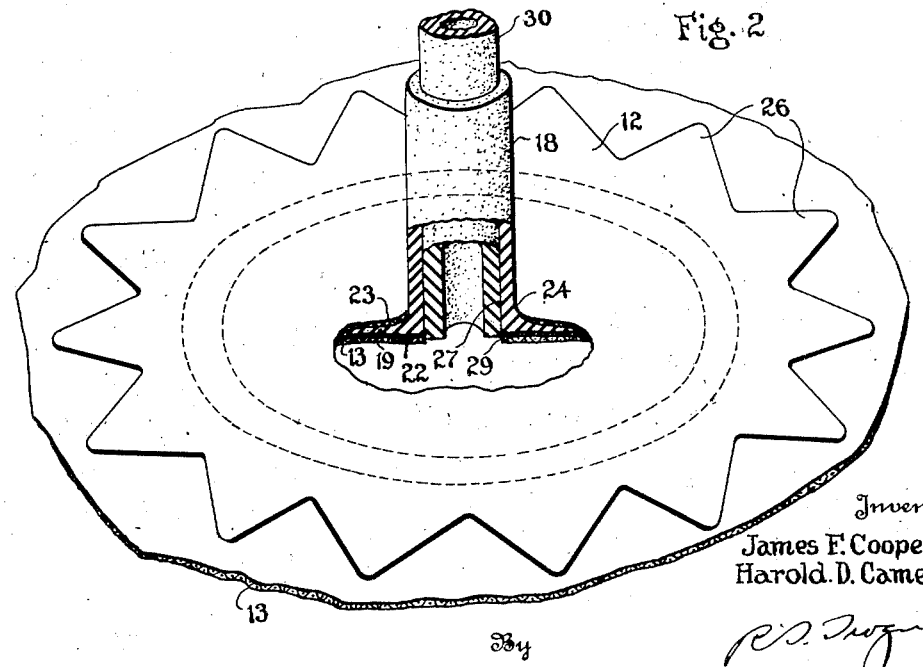
Figure 2 is a perspective view of a patch embodying the invention, portions being shown in cross-section.

A patch 12 in which the invention is embodied is attached to a flexible wall 13 of a container 14. One of the principal features of the invention is a tubular member 18 composed of rubber compound, or similar material, that has at one end thereof a radially disposed feather edged flange 19 substantially circular and composed of the same material. A ply 22 of rubberized fabric of greater diameter than the flange 19 is cemented or vulcanized to the surface thereof opposite the tubular member 18. Another similar ply 23 of rubberized fabric having a central opening 24 of less diameter than the diameter of the tubular member 18 is slit, as indicated at 25, and is forced over the latter into the position indicated in Figure 2. The diameter of the ply 23 is greater than the diameter of both the plies 19 and 22, and the edge portions of the former are so designed as to form a plurality of fingers 26.

After the elements 19, 22 and 23 have been assembled and cemented or vulcanized together, they form the unitary patch 12 which has an opening 27 extending entirely therethrough. The container wall 13 is provided with an opening 29, and the flanged portion of the patch 12 which includes the three elements 19, 22 and 23 is cemented or vulcanized to this wall in such manner that the openings 27 and 29 register with each other. A conduit 30, composed of either rigid or flexible material, fits closely within the opening 27, and is cemented or otherwise firmly secured therein, thereby providing for proper communication with a suitable supply of fluid under compression.

From the foregoing description it will be apparent that the flexible connections embodying the type of patch disclosed by this invention provide for proper communication between a fluid container and a source of supply of fluid under compression or otherwise, and at the same time the container walls are reinforced and maintained in fluid-tight condition. Since the tubular member 18 is composed of relatively resilient material, such as soft rubber, it provides for a positive and fluid-tight connection to the outer surface of the conduit 30.

Although we have illustrated only the preferred form which the invention may assume and have described that form in detail, it will be apparent to those skilled in the art that the invention is not so limited, but that various modifications may be made therein without departing from the spirit of the invention or from the scope of the appended claims.

What we claim is:

1. A patch comprising a vulcanizable tubular member having a radially flared end portion, a plurality of plies of rubberized fabric having areas greater than that of the flange vulcanized to the flanged end portion and constituting means for cementing the end portion to a flexible wall and a flexible conduit secured within the tubular member.

2. A combination connection comprising a tubular vulcanizable member having a flanged end portion, said flanged portion being disposed between a plurality of plies of rubber fabric, the area of the plies being greater than that of the flanged portion, the plies being adapted to be secured to the exterior of a gas container.

3. A combination comprising a vulcanizable tubular member having a flanged end portion, said portion being disposed between the plies of a multiply rubberized fabric patch extending radially beyond the flanged portions and having centrally formed openings therethrough in one of which the tubular member is disposed and the other of which registers with the opening within the tubular member, the plies of patch being adapted to be secured to the exterior walls of a container and being secured to the flanged end portion by means of an adhesive bond.

In witness whereof, we have hereunto signed our names.

Signed at Akron, in the county of Summit, and State of Ohio, this 17th day of April, 1929.

JAMES F. COOPER.
HAROLD D. CAMERON.